Dec. 15, 1970        J. VIT        3,548,225

VIBRATOR DRIVE DEVICE

Filed June 24, 1969

3,548,225
VIBRATOR DRIVE DEVICE
Jaroslav Vit, New York, N.Y., assignor of one-half to National Patent Development Corporation, New York, N.Y.
Filed June 24, 1969, Ser. No. 835,973
Int. Cl. H02k 33/16
U.S. Cl. 310—38                        10 Claims

ABSTRACT OF THE DISCLOSURE

An axial shaft is secured to a rotor which is rotatably mounted in the magnetic field in an opening in a multipole stator, the rotor and stator forming a motor which is periodically energized, there being springs between the shaft and the stator to produce alternating rotation of the rotor in opposite directions and concurrent axial reciprocation.

BRIEF SUMMARY OF THE INVENTION

This invention is directed to a drive for a device which is to undergo angular and axial vibration, and in particular vibratory movement in which a body moves axially in a first direction while rotating in one direction, and then axially in an opposite direction while rotating in the other direction to return to its original position. Such a movement is useful in transport mechanisms, grinding mechanisms, mixers, etc.

Known drives of the above type include a solenoid which is spaced from the body and springs between the body and a fixed support. Such drives have the disadvantage that the gap between the body and the solenoid changes during reciprocation of the body and this results in the generation of heat and the loss of substantial energy.

An object of the invention is to provide a drive device which avoids the aforementioned heat loss and which is highly efficient, thereby minimizing the energy requirements and the cost.

According to the invention there is provided a drive device comprising a motor including a stator having an opening and a rotor mounted in said opening within said stator for rotation and axial movement with respect thereto, spring means connected to said rotor to resist rotation and axial movement thereof, and means to energize said motor periodically and cause said rotor to undergo alternate rotation in opposite directions while concurrently the spring means produces reciprocation of said rotor.

According to a preferred embodiment, the spring means is constituted by a plurality of inclined rods embracing the shaft, each rod being connected to the stator and to a flange secured to the shaft. Thus, as the rotor is turned in one direction during a pulse of the motor, the rods are stressed and act to displace the flange and the shaft therewith in one axial direction, whereas when the rotor is released, the rods relax and turn the rotor towards its original position while displacing the shaft axially in the opposite direction.

DETAILED DESCRIPTION

Figure 1:
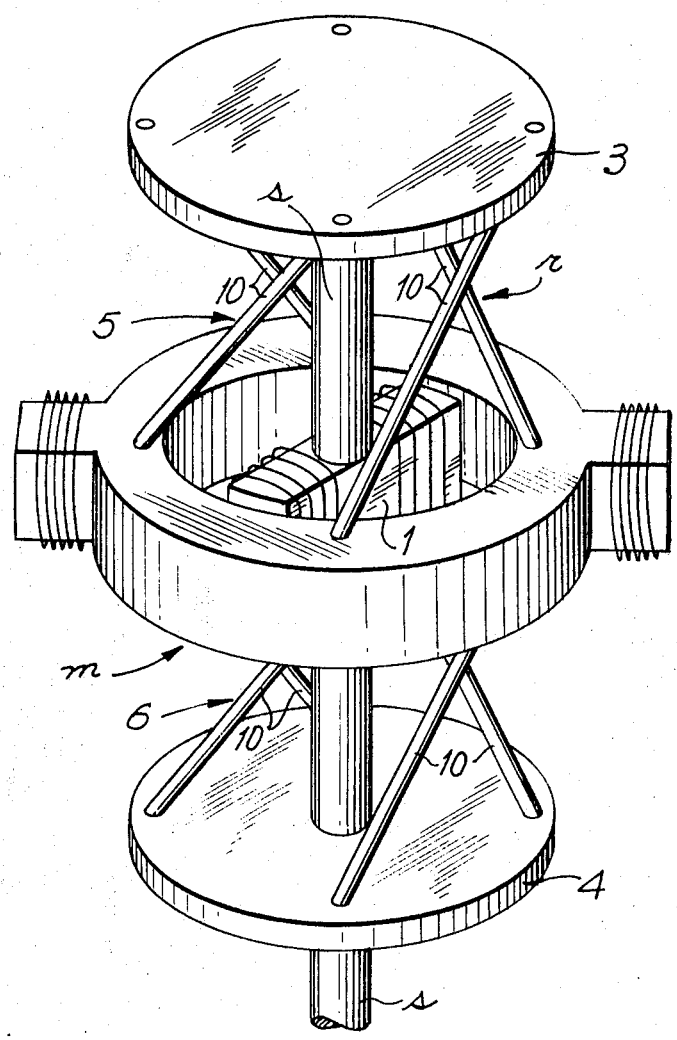
FIG. 1 is a perspective view diagrammatically showing the vibrator drive device according to the invention.

In the drawing a shaft $s$ is driven in concurrent axial and angular vibration by a motor $m$ and a spring arrangement $r$.

Figure 3:
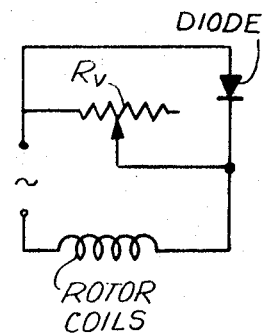
FIG. 3 is a simple circuit showing the electrical supply of the rotor.

The motor $m$ is constituted by a rotor 1 (armature) fixed to shaft $s$ and a multipole stator 2 which is rigidly fixed. The stator may either be formed with permanent magnets or with coils to constitute electromagnets. The motor is energized from an electrical supply source to produce periodic small angular movements of the rotor 1 in one direction. The magnitude of the angular movements can be controlled. As shown in FIG. 3, the rotor 1 is connected in a circuit supplied by an AC source and including a diode and a potentiometer $Rv$. By adjustment of the resistance of the potentiometer, various voltage forms can be obtained between sinusoidal and complete half wave rectification. Thereby the rotor 1 can be selectively energized with alternating spaced pulses.

The spring arrangement $r$ serves to produce an axial vibration of the shaft, together with angular oscillation. For this purpose, the shaft is provided with flanges 3, 4 secured thereto and the spring arrangement includes spring units 5, 6 connected to the stator 2 and to respective flanges 3, 4, the spring units extending on opposite sides of the rotor 1. The spring units are arranged to supplement one another's action on shaft $s$ to produce axial and angular vibration. Although ordinary coil springs can be used for units 5, 6, these are generally too soft to center the rotor and an additional means, such as a bearing is necessary. Therefore, a specific arrangement of rods 10 is employed, as will be discussed more fully hereafter.

Four rods extend from the stator 2 to respective flanges 3, 4 and are secured to the stator and the flanges. The rods in each spring unit are arranged in equal angular intervals $$\left(\frac{360}{4} = 90°\right)$$

and the rods all exend away from the stator with the same inclination, i.e. about 30°. Each rod lies in a plane which is perpendicular to the adjacent rods. When the rotor is moved angularly over a small angular distance during each pulse of the motor, the rods 10 urge the shaft $s$ in an axial direction, dependent upon the direction of rotation of the rotor and the direction of inclination of the rods. For example, in FIG. 1 of the drawing, when the shaft is turned counterclockwise by the rotor, the shaft is moved downwardly by the rods. When the pulse is terminated, the stored energy in the rods acts to return the shaft to its original position. A greater or lesser number of rods can be employed, depending on the magnitude of the forces involved. For this purpose, the rods can be detachably secured at their ends to the stator and their respective flanges.

Although four rods have been shown in each spring unit, it is necessary only to have a minimum total of three rods, namely two in one spring unit and one in the other. The rods in the upper spring unit are angularly offset relative to the rods in the lower spring unit to define equal intervals therewith. Thus, in the case of three rods, they will be offset by $$\frac{360}{3} \text{ or } 120°$$

In the case of four rods in both the upper and lower units, the rods will be offset by $$\frac{360}{8} \text{ or } 45°$$

the rods in each unit being offset from one another by 90°.

Figure 2:
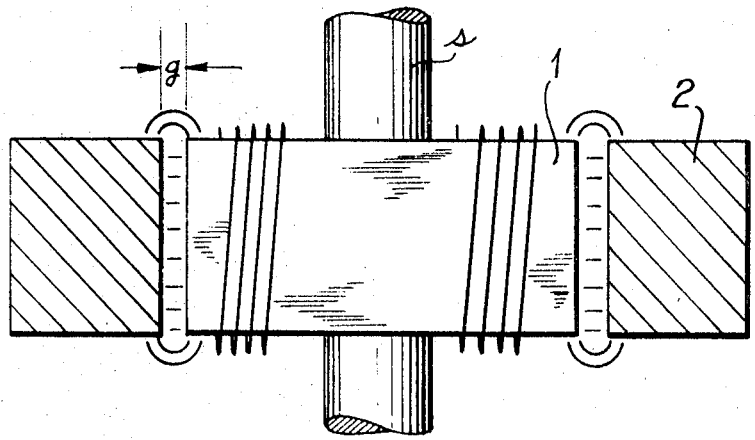
FIG. 2 is a side view of the rotor and stator portions of the motor of the vibrator drive device.

In the arrangement according to the invention, the rotor undergoes relatively small axial displacement with respect to the stator and hence the magnetic field is substantially undisturbed. This is shown in dotted outline in FIG. 2, which indicates the extent of displacement of the rotor. Moreover, the gap $g$ between the rotor 1 and stator 2 remains constant during displacement of the rotor. Because of the relative undisturbed state of the magnetic field and the constancy of the gap $g$, relatively insignificant energy is lost in heat generation. This is in contrast with known arrangements in which a solenoid and the shaft are axially spaced and the shaft reciprocates towards and away from the solenoid during alternate energization thereof. In such arrangements, because of the variation in the gap, great heat losses are developed and the efficiency for the same power input and displacement as compared to the arrangement of the invention is only of the order of 8% of that of said arrangement.

Although only a single rotor and stator have been illustrated in the drawing, it is possible to mount a plurality of rotors along the shaft and to associate each with a surrounding stator when substantial axial force may be desired.

The invention has been described with reference to a single embodiment thereof and it is evident that numerous variations and modifications thereof can be made by those skilled in the art, without departing from the scope and spirit of the invention.

What is claimed is:

1. Drive means comprising a motor including a stator defining an annular opening and a rotor mounted in said opening within said stator and defining a circumferential gap therebetween for production of a magnetic field, said rotor being mounted in said opening for rotation and axial movement with respect to said stator, spring means directly connected to said rotor and stator to resist rotation and axial movement thereof, and means to energize said motor periodically and cause said rotor to undergo alternate rotation in opposite directions while concurrently the spring means produces reciprocation of said rotor, said gap remaining substantially constant and undisturbed during rotation and reciprocation.

2. Drive means as claimed in claim 1, wherein said means which periodically energizes the motor produces a torque turning the rotor in one direction, the spring means returning the rotor in the opposite direction between successive energizations.

3. Drive means as claimed in claim 1, wherein said rotor comprises a shaft with a flange thereon, said spring means being connected to said stator and flange.

4. Drive means as claimed in claim 3, wherein said spring means comprises a plurality of inclined rods embracing said shaft, each rod having one end connected to said stator and an opposite end connected to said flange.

5. Drive means as claimed in claim 4, wherein said rods are at least three in number and are arranged at equal angular intervals around said shaft.

6. Drive means as claimed in claim 5, wherein each rod lies in a plane which is perpendicular to the adjacent rods.

7. Drive means as claimed in claim 6 comprising a second flange on said shaft, at least one rod being connected to said stator and said second flange.

8. Drive means as claimed in claim 7, wherein said rods are inclined at an angle of about 30° relative to the stator when said rotor is at rest.

9. Drive means as claimed in claim 8, wherein said rods have a smooth surface and a circular cross-section.

10. Drive means as claimed in claim 1, wherein said means to energize said motor comprises a half wave rectification source.

References Cited
UNITED STATES PATENTS

| | | | |
|---|---|---|---|
| 2,662,192 | 12/1953 | Weyandt | 310—38 |
| 2,909,739 | 10/1959 | Cherniak | 74—99X |
| 2,741,712 | 4/1956 | Lonnqvist | 310—37 |
| 2,823,323 | 2/1958 | Lamm | 310—20 |
| 3,010,061 | 11/1961 | Burt | 318—132 |

FOREIGN PATENTS

| | | |
|---|---|---|
| 1,053,620 | 1/1967 | Great Britain. |

MILTON O. HIRSHFIELD, Primary Examiner

B. A. REYNOLDS, Assistant Examiner

U.S. Cl. X.R.

74—99; 310—80; 318—115; 335—228